(12) United States Patent
Matthews et al.

(10) Patent No.: US 6,621,515 B2
(45) Date of Patent: Sep. 16, 2003

(54) SYSTEM AND METHOD FOR ROUTING VIDEO CALLS

(75) Inventors: Gordon H. Matthews, Austin, TX (US); James H. Stephens, Jr., Austin, TX (US)

(73) Assignee: Forgent Networks, Inc., Austin, TX (US)

( * ) Notice: Subject to any disclaimer, the term of this patent is extended or adjusted under 35 U.S.C. 154(b) by 129 days.

(21) Appl. No.: 10/002,728

(22) Filed: Oct. 31, 2001

(65) Prior Publication Data

US 2003/0081114 A1 May 1, 2003

(51) Int. Cl.[7] .................................................. H04N 7/14
(52) U.S. Cl. .................................. 348/14.11; 348/14.12; 370/219; 379/279
(58) Field of Search .......................... 348/14.08, 14.09, 348/14.11–14.13, 14.01; 370/216, 217, 218, 219, 220; 379/279, 269; H04N 7/14

(56) References Cited

U.S. PATENT DOCUMENTS 6,081,291 A * 6/2000 Ludwig et al. ........... 348/14.11

FOREIGN PATENT DOCUMENTS

EP 0690597 A1 * 1/1996 ............ H04L/12/56
JP 404276972 A * 10/1992 ............ H04M/3/56

OTHER PUBLICATIONS

Ganmukhi et al. ; Control processor switch over for a telecommunications switch; Mar./1999; WO 99/11002.*

* cited by examiner

Primary Examiner—Melur Ramakrishnaiah
(74) Attorney, Agent, or Firm—Baker Botts L.L.P.

(57) ABSTRACT

A method and system for routing video calls includes one or more video endpoints. An array of infrastructure routing elements transmits the video calls between the video endpoints along one or more principle routes and one or more back-up routes. The system and method further includes a video network platform in communication with the video endpoints and the infrastructure routing elements, and the video network platform prioritizing the principle routes and the back-up routes. A scheduling engine associated with the infrastructure routing elements is operable to monitor the performance of the infrastructure routing elements, determine a reliability model for each infrastructure routing element, and intelligently route the video calls based on the reliability models without losing communication between the video endpoints.

35 Claims, 3 Drawing Sheets

SYSTEM AND METHOD FOR ROUTING VIDEO CALLS

TECHNICAL FIELD

This invention relates generally to video call communications, and more specifically relates to a system and method for routing video calls.

BACKGROUND

Video communications give a personal touch that is simply not available from audio only telephone communications. Participants in a video call have a greater personal presence and also are able to share presentations and data in a more meaningful manner than is available with audio only communications. Indeed, businesses have invested substantial sums in video devices to take advantage of the more personal communication provided by video calls. As a result, video calls have grown as a more common manner of communications, both for intra company meetings and meetings with outside businesses conducted through public networks.

Unfortunately, configuring, scheduling, establishing, and maintaining a video call is a complex process beyond the expertise of most users of video devices. For example, there are different types of video devices from various manufacturers. Assuming that a user is able to successfully interact with different video devices, other complexities remain as an obstacle to a successful video call configuration. With multi-endpoint video calls, the user must typically route the video call through an infrastructure routing element such as a multipoint control unit (MCU). As another layer of complexity, if video devices communicate over different protocols, such as H.323 and H.320, then the user typically must route the video call through a gateway device.

Establishing and maintaining a video call is an important and difficult task for the users of video devices. For instance, once a video call is established, if a failure or malfunction occurs in one of the devices routing the video calls typically the video call is lost or has to be taken down and then reestablished using different MCU's. Losing the video call is burdensome to the users because the downtime required to reestablish the video call is an inefficient use of time because the users cannot communicate with other users in different locations and do not know when the connection for the video call will be reestablished. Therefore, the users generally have to wait for the video call to be reestablished when they could be doing something more productive.

In addition, configuring a video call through different infrastructure routing elements also creates difficulties. Routing a video call between two or more video devices requires the use of infrastructure routing elements such as MCU's. There are various types of MCU's produced by different manufacturers. When routing a video call, the users want to take advantage of the most efficient and dependable MCU's to help insure that the video call will not be lost once the video call is established. Typically though, MCU reliability information is not available to the users or if it is available, the information is not consistently updated to reflect current operating status for the MCU's. Therefore the users must either guess as to what are the most reliable infrastructure routing elements or route the video calls through what where at one point in time the most efficient or dependable MCU's but may not currently be the most reliable. In addition to the availability of MCU reliability information, routing video calls through MCU's may be difficult to the MCU's not having sufficient resources for a video call but the user is not aware of this problem. Insufficient resources may result from other video calls scheduled at the same time or the other video calls consuming all MCU bandwidth. Access to this information is typically also not available to the users further creating additional routing difficulties.

Because losing a video call and reestablishing the video call after the video call begins results in an inefficient use of the user's time, monitoring the video call while the video call is operational is important to having a dependable and effective video network. Typically, the route or path of transmission for the video call between the video devices and infrastructure routing elements provides information on whether there are any errors with the video call. Generally, the transmission may send out pings and receive answers back from the pings to determine the status of the transmission. But the fallacy in this arrangement is that the transmission of the video call is reporting back on itself and there is no external monitoring of the video calls. Since the video call transmission is reporting back on itself, the video call transmission may be less likely to detect errors or malfunctions or not detect errors or malfunctions as quickly as an external monitor. Therefore, the users may experience malfunctions or lost video calls that may have been preventable if the transmission of the video calls were monitored by an external monitor.

SUMMARY

Therefore a need has arisen for a system and a method which provides for quickly re-routing a video call without losing communication between the video endpoints.

A further need has arisen for a system and method that allows the video network to take advantage of the most dependable and efficient infrastructure routing elements.

A further need exists for a system and method which allows for the external monitoring of the video network.

In accordance with the present invention, a system and method are provided which substantially reduce the problems and disadvantages associated with routing video calls. A video network allows for the intelligent scheduling and routing of video calls based on the historical and current performance of one or more infrastructure routing elements thereby allowing video calls to be re-routed without losing communication between the video endpoints.

More specifically, a video network includes one or more video endpoints in communication with a video network platform. The video network further includes an array of infrastructure routing elements associated with the video endpoints that transmit video calls between the video endpoints along one or more routes. A scheduling engine, associated with the video network platform and the infrastructure routing elements, monitors the performance of the infrastructure routing elements, determines a reliability model for each infrastructure routing element or for a selected grouping or combination of infrastructure routing elements, and intelligently routes the video calls using the reliability models for the infrastructure routing elements.

More specifically, the scheduling engine monitors the infrastructure routing elements for malfunctions or failure. When an infrastructure routing element experiences a malfunction, the scheduling engine updates the reliability model corresponding to the infrastructure routing element experiencing the malfunction noting both the failure of the infrastructure routing element and the operational parameters surrounding the failure. When an infrastructure routing element fails, the scheduling module re-routes the video call that was going through the failed infrastructure routing element to a predetermined back-up route or through a different route based on which of the available infrastructure routing elements are the most reliable and efficient.

In an alternative embodiment, the infrastructure routing elements comprise MCU's having one or more input ports and one or more output ports. Each input port and each output port has a corresponding reliability model that relates to the performance of the ports. When a port experiences a malfunction or failure, the scheduling engine is operable to re-route the video calls among the ports of the MCU based on the reliability model of each input port and each output port as well as other MCU's, alternate gateways, routers, switches, and other appropriate video devices. Re-routing a video call between different ports on a MCU allows for a video call to be re-routed without losing communication between the video devices. In addition, the MCU's having multiple ports also allows for more than one video call to pass through a single MCU at the same time.

In an alternative embodiment, the video network platform utilizes non-enterprise infrastructure routing elements to complete and re-route video calls. There may be instances when an infrastructure routing element fails but there are no available infrastructure routing elements to re-route the video call through because all the other infrastructure routing elements within the video network are processing other video calls. In these instances, the scheduling engine utilizes one or more non-enterprise infrastructure routing elements to re-route the video call to keep the video call going. The scheduling engine determines a probability regarding when and how many of the non-enterprise infrastructure routing elements may be needed and schedules with the owner of the non-enterprise infrastructure routing elements use of the non-enterprise infrastructure routing elements so that some number of non-enterprise infrastructure routing elements will be available to the video network. Therefore, when an infrastructure routing element fails and no enterprise owned infrastructure routing elements are available, the video call may be re-routed using one or more of the non-enterprise infrastructure routing element.

In another embodiment, the video network platform employs a principle route and a back-up route for a video call. The video network platform prioritizes the principle and back-up routes so that a principle route for one video call takes priority over the back-up route for another video call. Therefore, if the principle route of one video call uses the same infrastructure routing element as the back-up route of another video call, the video network platform re-routes the back-up route so the back-up route no longer interferes with the principle route.

The present invention provides a number of important technical advantages. One important technical advantage of the present invention is that video calls may be quickly re-routed without losing communication between the video endpoints. Re-routing video calls without having to drop the communication between the video endpoints increases productivity because the video call continues as the video call is being re-routed. Because no video call down-time is required to re-route the video call, the majority of users may not even know that that video call was re-routed and no time is lost to reestablishing the video call. In addition, the video call continues without any interruption allowing for video call performance that is satisfactory to the users.

Another important technical advantage of the present invention is the ability to route video calls through the most reliable or efficient infrastructure routing elements such as MCU's. The ability to track and monitor the performance of the infrastructure routing elements allows for knowledge of which infrastructure elements are most dependable and least likely to experience a failure or other malfunction. Therefore, when all the infrastructure routing elements are not utilized, video calls may be routed through the most dependable or efficient infrastructure routing elements to create a more dependable and stable video call for the users. In addition, infrastructure routing elements that are prone to failures and malfunctions can be avoided so as to have a more reliable video network.

Another important technical advantage of the present invention is the external monitoring of the transmission of the video calls. External monitoring allows for the monitoring of all aspects of the video calls instead of just monitoring the routes and transmissions. Having an external monitor instead of having the route report back on itself allows for a more comprehensive understanding of the video network and how every element within the video network is functioning. External monitoring of the entire video network allows for more errors to be detected because all the elements are being monitored instead of only the route. Therefore, more errors are likely to be discovered and errors are likely to be discovered earlier which allows for time to make a correction and keep the video calls going without losing communication between the video devices.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments of the present invention are illustrated in the figures, like numerals being used to refer to like and corresponding parts of the various drawings.

Video networks typically include one or more video calls transmitted between a variety of video endpoints through one or more infrastructure routing elements. Video calls include video communications, audio communications, and data communications. When an infrastructure routing elements fails, in order to keep the video call going, the video call must be re-routed through different infrastructure routing elements. But if the video network has no knowledge of how the infrastructure routing elements perform, merely re-routing the video call to the next available infrastructure routing element may result in the video call experiencing another error or malfunction. But the external tracking and monitoring of the performance of the infrastructure routing elements allows for more efficient routing and re-routing of video calls. The scheduling engine of the present invention improves video call routing and re-routing by monitoring and tracking the performance of each infrastructure routing element to determine which infrastructure routing elements are the most dependable and which ones are prone to failure thereby allowing the intelligent routing and re-routing of video calls.

Figure 1:
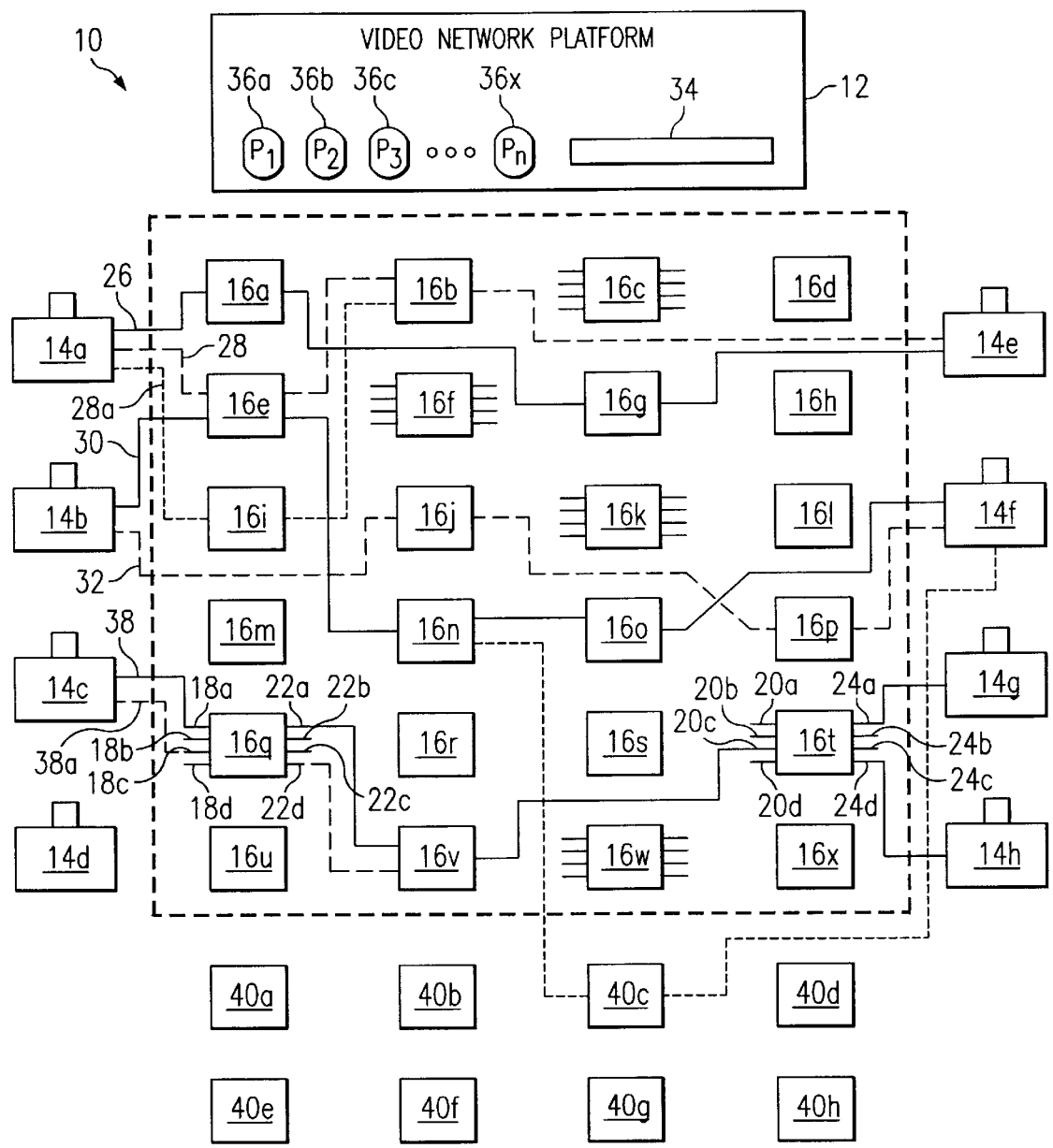
FIG. 1 depicts a block diagram of video devices in communication with a video network platform and video network.

Referring now to FIG. 1, a block diagram depicts video network 10 under the control of video network platform 12. Video devices such as video endpoints 14 and infrastructure routing elements 16 communicate with video network platform 12 over an internal company network, such as an intranet, or a public network, such as the Internet. Video endpoints 14 include specially manufactured video communication equipment and personal computer based video communication equipment that record and transmit local images of participants and display images of other participants received from remote locations. Video network 10 allows for the interoperation of a diversity of video endpoints 14 from different video endpoint manufacturers such as VTEL, Tanburg, PictureTel, and Polycom. Infrastructure routing elements 16 include specially manufactured and server based units that coordinate multi-endpoint video conference calls, including calls sent by TCP/IP and may include such devices as multipoint control units ("MCU"). Video network 10 includes an array of infrastructure routing elements 16. Although there are twenty four infrastructure routing elements 16 in the embodiment shown in FIG. 1, alternate embodiments may include more or less than twenty four infrastructure routing elements 16. In addition, infrastructure routing elements 16 may have one or more input ports and one or more output ports depending on the type of infrastructure routing elements 16 selected to form the array. For example, infrastructure routing element 16a has a single input port and a single output port which allows infrastructure routing element 16a to process only one video call at a time. Infrastructure routing element 16q has four input ports 18a–18d and four output ports 22a–22d allowing infrastructure routing element 16q to process up to four different video calls at the same time. The multiple input ports and output ports also allows one video endpoint 14 to communicate with more than one video endpoint 14 on the same video call.

Video network platform 12 coordinates the actions of video endpoints 14 and infrastructure routing elements 16, including the scheduling of video calls and the initiation of video calls. For instance, the users requires a videoconference between video endpoint 14a and video endpoint 14e. In order to have a video call between video endpoints 14a and 14e, there needs to be a communication or transmission between video endpoints 14a and 14e. The transmission must follow a particular route from video endpoint 14a through the array of infrastructure routing elements 16 to video endpoint 14e. In order to determine the route for the video call between video endpoints 14a and 14e, video network platform 12 or a video network administrator determines what infrastructure routing elements 16 are available and applies a predetermined routing algorithm that selects an appropriate path based on the available infrastructure routing elements 16. For example, the video call travels along principle route 26 from video endpoint 14a to infrastructure routing element 16a to infrastructure routing element 16g to video endpoint 14e.

At the same time that video network platform 12 establishes principle route 26, video network platform 12 also establishes a back-up route 28 between video endpoints 14a and 14e. Back-up route 28 travels from video endpoint 14a to infrastructure routing element 16e to infrastructure routing element 16b to video endpoint 14e. No video call travels along back-up route 28 unless something happens to principle route 26. If for example infrastructure routing element 16a experiences a failure or malfunction, principle route 26 no longer would carry the video call and the video call is lost between video endpoints 14a and 14e. But with back-up route 28 already in place, if an error or malfunction occurs with one of the infrastructure routing elements 16 present in principle route 26, video network platform 12 can implement back-up route 28 very quickly and keep the video call going. Or if the video call is lost when principle route 26 experiences an error, video network platform 12 may reestablish the video call very quickly using back-up route 28 and the video call continues between video endpoints 14a and 14e.

As the video call between video endpoints 14a and 14e occurs, the users of video network 10 decide to establish a video call between video endpoints 14b and 14f. As with the video call between video endpoints 14a and 14e, video network platform 12 examines the available infrastructure routing elements 16 and applies the predetermined routing algorithm to establish a route for the video call between video endpoints 14b and 14f. When establishing the video call between video endpoints 14b and 14f, the video call route cannot use any of infrastructure routing elements 16 being used in the video call between video endpoints 14a and 14e since the infrastructure routing elements 16 used in principle route 26 only have one input port and one output port.

Video network platform 12 determines the best path for the video call between video endpoints 14b and 14f to be principle route 30. Principle route 30 travels from video endpoint 14b to infrastructure routing element 16e to infrastructure routing element 16n to infrastructure routing element 16o to video endpoint 14f. Infrastructure routing element 16e, although not in use, is part of back-up route 28. Therefore, the concept of prioritization comes into play and video network platform 12 prioritizes principle routes over back-up routes. For example, principle route 30 and back-up route 28 both utilize infrastructure routing element 16e. Since video network platform prioritizes principle routes over back-up routes, video network platform 12 allows principle route 30 to use infrastructure routing element 16e and re-routes back-up route 28 so that back-up route 28 no longer utilizes infrastructure routing element 16e. Video network platform 12 re-routes back-up path 28 as back-up route 28a going from video endpoint 14a to infrastructure routing element 16i instead of infrastructure routing element 16e. Video network platform 12 substitutes infrastructure routing element 16i in for infrastructure routing element 16e allowing the video call between video endpoints 14a and 14e to still have a back-up route and allowing principle route 30 to utilize infrastructure routing element 16e. As with the video call between video endpoints 14a and 14e, video network platform 12 also establishes back-up route 32 for the video call between video endpoints 14b and 14f. In addition to having two separate back-up routes 28a and 32, principle routes 26 and 30 may also share the same back-up route. Sharing back-up routes allows for greater utilization of infrastructure routing elements 16 in that more infrastructure routing elements 16 are available to be used routing different video calls.

In addition to scheduling and routing video calls between video endpoints 14 using principle routes and back-up routes, video network platform 12 also monitors the video calls and each infrastructure routing element 16 for any errors or malfunctions that may occur after the video calls begin. Scheduling engine 34, associated with video network platform 12, monitors the performance of each infrastructure routing element 16 and selected combinations of infrastructure routing elements 16 through reliability models 36. Certain combinations of infrastructure routing elements 16 may reliably function together and scheduling engine 34 also needs to monitor and track the performance of the combinations to provide a greater understanding of how best to route video calls. Included in video network platform 12 are reliability models 36 associated with each infrastructure routing element 16 present in the array as well as selected combinations of infrastructure routing elements 16 so that there are as many reliability models 36 as there are infrastructure routing elements 16 and selected combinations of infrastructure routing elements 16. Reliability models 36 are a reliability factor for each infrastructure routing element 16 and each combination of infrastructure routing elements 16 as a function of the past and present performance of infrastructure routing elements 16 and the combinations of infrastructure routing elements 16. For example, reliability model 36a is associated with infrastructure routing element 16a while reliability model 36r is associated with infrastructure routing element 16r.

Scheduling engine 34 monitors the performance of infrastructure routing elements 16 and updates reliability models 36 based on the performance of infrastructure routing elements 16. For example, if infrastructure routing element 16n experiences a failure while processing the video call between video endpoints 14b and 14f, scheduling engine 34 updates reliability model 36n with the fact that infrastructure routing element 16n experiences a failure. In addition to recording the fact of a failure, scheduling engine 34 also updates reliability model 36 with operational parameters surrounding the failure such as what time the failure occurred, the line speed, the protocol connection type, how many video calls were going through the infrastructure routing element at the time of failure, and any other appropriate operational parameters.

Scheduling engine 34 uses reliability models 36 to track which infrastructure routing elements 16 and combinations of infrastructure routing elements 16 are more likely to fail and therefore determine which infrastructure routing elements 16 are more dependable and more efficient. Knowing which infrastructure routing elements 16 are likely to fail enables scheduling engine 34 to route and re-route the video calls taking advantage of the most dependable infrastructure routing elements 16. For example, principle route 30 transmits a video call between video endpoints 14b and 14f. During the video call, infrastructure routing element 16n experiences a failure and the video call needs to be re-routed through a different infrastructure routing element 16. When infrastructure routing element 16n fails, scheduling engine 34 updates reliability model 36n.

Scheduling engine 34 then examines reliability models 36 for the available infrastructure routing elements 16 to determine the best way to re-route the video call. Using the operational parameters, scheduling engine 34 determines which infrastructure routing element 16 is best suited to replace infrastructure routing element 16n by looking at which available infrastructure routing elements 16 have a reliability model 36 that best fits the operational parameters. For instance, if failure occurred at 3:30 pm with 284 kilobits, scheduling engine 34 examines reliability models 36 for the available infrastructure routing elements 16 and determines which infrastructure routing element 16 most reliably operates within those operation parameters. Scheduling engine 34 may determine that infrastructure routing element 16r functions best and therefore scheduling engine 34 re-routes the video call from video endpoint 14b to infrastructure routing element 16e to infrastructure routing element 16r to infrastructure routing element 16o to video endpoint 14f. Therefore, the video call is able to continue and the most efficient and dependable infrastructure routing elements 16 are utilized.

In addition to re-routing the video calls, scheduling engine 34 may also use reliability models 36 to initially route video calls. Once infrastructure routing elements 16 have had a sufficient amount of use, reliability models 36 will give an indication of how infrastructure routing elements 16 normally function. To function efficiently, video network platform 12 needs to take advantage of infrastructure routing elements 16 and combinations of infrastructure routing elements 16 that are most reliable and only use infrastructure routing elements 16 that are most likely to fail when there is no other alternative. Therefore, if a user wanted to set up a video call between video endpoints 14a and 14e, scheduling engine 34 may automatically determine what route is the best to use based on the performance of infrastructure routing elements 16 indicated by reliability models 36.

Video network platform 12 also takes full advantage of the most reliable infrastructure routing elements 16. If infrastructure routing element 16f with its four input ports and four outputs ports rarely experiences failures, scheduling engine 34 wants to route as many video calls as possible through infrastructure routing element 16f before moving on to different infrastructure routing element 16. And if infrastructure routing element 16s experiences a failure eight times out of every ten times it is used, the associated reliability model 36 reflects this poor performance and scheduling engine 34 would only want to use infrastructure routing element 16s as a final alternative. Therefore, monitoring the performance of infrastructure routing elements 16 and recording the performance using reliability models 36 allows video network platform 12 and scheduling engine 34 to intelligently route and re-route video calls using the most efficient and dependable infrastructure routing elements 16.

A benefit of monitoring infrastructure routing elements 16 is that scheduling engine 34 creates reports detailing the performance of infrastructure routing elements 16. Using reliability models 36, scheduling engine 34 has access to all details surrounding the performances and failures of infrastructure routing elements 16. Whenever an infrastructure routing element 16 fails, scheduling engine 34 may automatically generate a report to a network system administrator giving the details of the failure. Generated reports may also detail which infrastructure routing elements 16 are most dependable, what routes have the least amount of failures, and any other suitable operational parameters relating to the operation of video network 10. In addition, scheduling engine 34 may also generate reports to the manufacturers of infrastructure routing elements 16 when a particular infrastructure routing element 16 consistently fails. For example, if infrastructure routing element 16x has a 95% failure rate, scheduling engine 34 recognizes this and generates a report to the manufacturer of infrastructure routing element 16x stating that infrastructure routing element 16x is faulty and is in need of repair or replacement.

Scheduling engine 34 also uses reliability models 36 re-route video calls using infrastructure routing elements 16 as discreet elements versus re-routing the video call as a whole. For example, scheduling engine 34 examines reliability models 36 and determines that infrastructure routing element 16m is a good substitute for infrastructure routing element 16h in that the conditions under which infrastructure routing element 16h normally fails are conditions under which infrastructure routing element 16m thrives. Therefore, scheduling engine 34 performs back-up scheduling on infrastructure routing element 16h as a discreet element. Instead of examining reliability models 36 for all available infrastructure routing elements 16 when infrastructure routing element 16h fails, scheduling engine 34 automatically re-routes a video call through infrastructure routing element 16m. Therefore the video call may be reestablished very quickly and efficiently since scheduling engine 34 performs back-up scheduling on infrastructure routing elements 16 as discreet elements.

With infrastructure routing elements 16 having multiple input ports and output ports, scheduling engine 34 is operable to route and re-route video calls based on reliability models 36 for each input port and each output port. Reliability model 36 associated with an infrastructure routing element 16 that has more than one input and output ports stores performance data not only on the infrastructure routing element 16 as a whole but also for each input port and each output port. Re-routing video calls among different ports on the same infrastructure routing element 16 allows for scheduling engine 34 to re-route video calls without losing the communication between video endpoints 14.

For example, video network platform 12 initiates a video call between video endpoints 14c, 14g, and 14h along route 38. Route 38 passes through input port 18a and output port 22a of infrastructure routing element 16q to infrastructure routing element 16v to input port 20c and output ports 24a and 24d of infrastructure routing element 16t. During the video call, input port 18a and output port 22a experience a failure. Scheduling engine 34 notices the failure and begins to re-route the video call so as to keep the video call going. Scheduling engine 34 recognizes that input ports 18b–18d are available and output ports 22b–22d are available. Examining reliability model 36 for infrastructure routing element 16q, scheduling engine 34 determines that input port 18c is the second most reliable port after input port 18a and output port 22d is the second most reliable output port after output port 22a. Therefore, scheduling engine 34 re-routes the video call from input port 18a to input port 18c and from output port 22a to output port 22d along route 38a without losing communication between video endpoints 14c, 14g, and 14h. In addition, scheduling engine 34 notes in the associated reliability model 36 the failures of input port 18a and output port 22a. Since scheduling engine 34 does not have to switch infrastructure routing elements 16 when re-routing the call, scheduling engine 34 is able to react to the failure and re-route the video call quickly and efficiently without losing communication between video endpoints 14c, 14g, and 14h.

Infrastructure routing elements 16 are owned and operated by an enterprise that controls and operates video network 10 and video network platform 12. But there may be situations when all infrastructure routing elements 16 are either being utilized or unavailable for use due to malfunctions. In this situation, if another infrastructure routing element 16 experiences a failure, there will be no infrastructure routing elements 16 available for re-routing.

In order to re-route a video call, scheduling engine 34 utilizes non-enterprise infrastructure routing elements 40. Non-enterprise infrastructure routing elements 40 are owned by a cooperative enterprise, a service bureau enterprise, or another party not associated with the owner of video network platform 12. Video network platform 12 may use a structured table that may be adopted as an industry standard, thereby allowing interoperability of video network platform 12 with any group of one or more infrastructure routing elements 16 or non-enterprise infrastructure routing elements 40 regardless of who owns or controls infrastructure routing elements 16 and non-enterprise infrastructure routing elements 40.

Scheduling engine 34 borrows one or more of non-enterprise infrastructure routing elements 40 to re-route video calls. For example, if infrastructure routing element 16o within principle route 30 experiences a failure and there are no available infrastructure routing elements 16 for use for re-routing the video call, scheduling engine 34 contacts non-enterprise infrastructure routing elements 40 to determine if any of those are available. Non-enterprise infrastructure routing element 40c is available and scheduling engine 34 re-routes the video call from infrastructure routing element 16n to non-enterprise infrastructure routing element 40c to video endpoint 14f and the video call continues.

Scheduling engine 34 may borrow or use as many of non-enterprise infrastructure routing elements 40 as are available and needed. To guarantee that at least a minimum number of non-enterprise infrastructure routing elements 40 are available to scheduling engine 34, the owner of video network platform 12 needs to have an arrangement with the owner of non-enterprise infrastructure routing elements 40. Scheduling engine 34 calculates a probability regarding how many non-enterprise infrastructure routing elements 40 may be needed and when they may be needed based on the prior needs of video network 10. With that probability determined, scheduling engine 34 schedules with the owner of non-enterprise infrastructure routing elements 40 the predicted need and those non-enterprise infrastructure routing elements 40 are set aside for use by scheduling engine 34. The ability to use non-enterprise infrastructure routing elements 40 expands the capabilities of video network 10 and allows for greater flexibility in the re-routing abilities of scheduling engine 34.

Scheduling engine's 34 monitoring of the performance of infrastructure routing elements 16 allows for video network 10 to have an external monitor of all the video calls and infrastructure routing elements 16. Because scheduling engine 34 as the monitor resides apart from the routes of the video calls, the video call routes do not have to report back on themselves. Scheduling engine 34 serves as an out-of-band connection that monitors the scheduling and all video devices. Scheduling engine 34 can react to problems over the entire video network 10 and discover problems that may be affecting video network 10 as a whole but not any individual video devices.

Figure 2A:
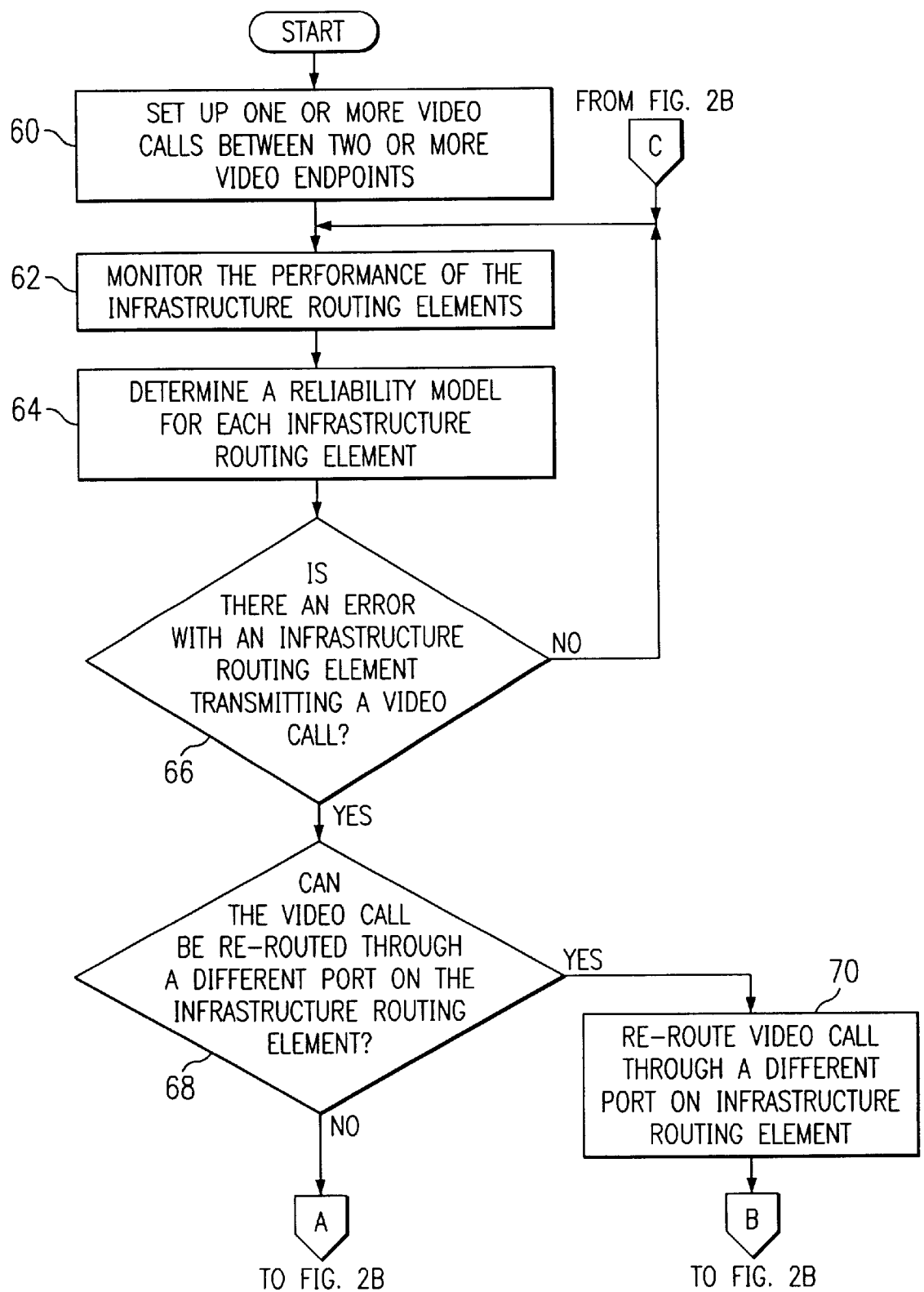
FIGS. 2A and 2B depict a method of routing video calls using the reliability models for the infrastructure routing elements.
Figure 2B:
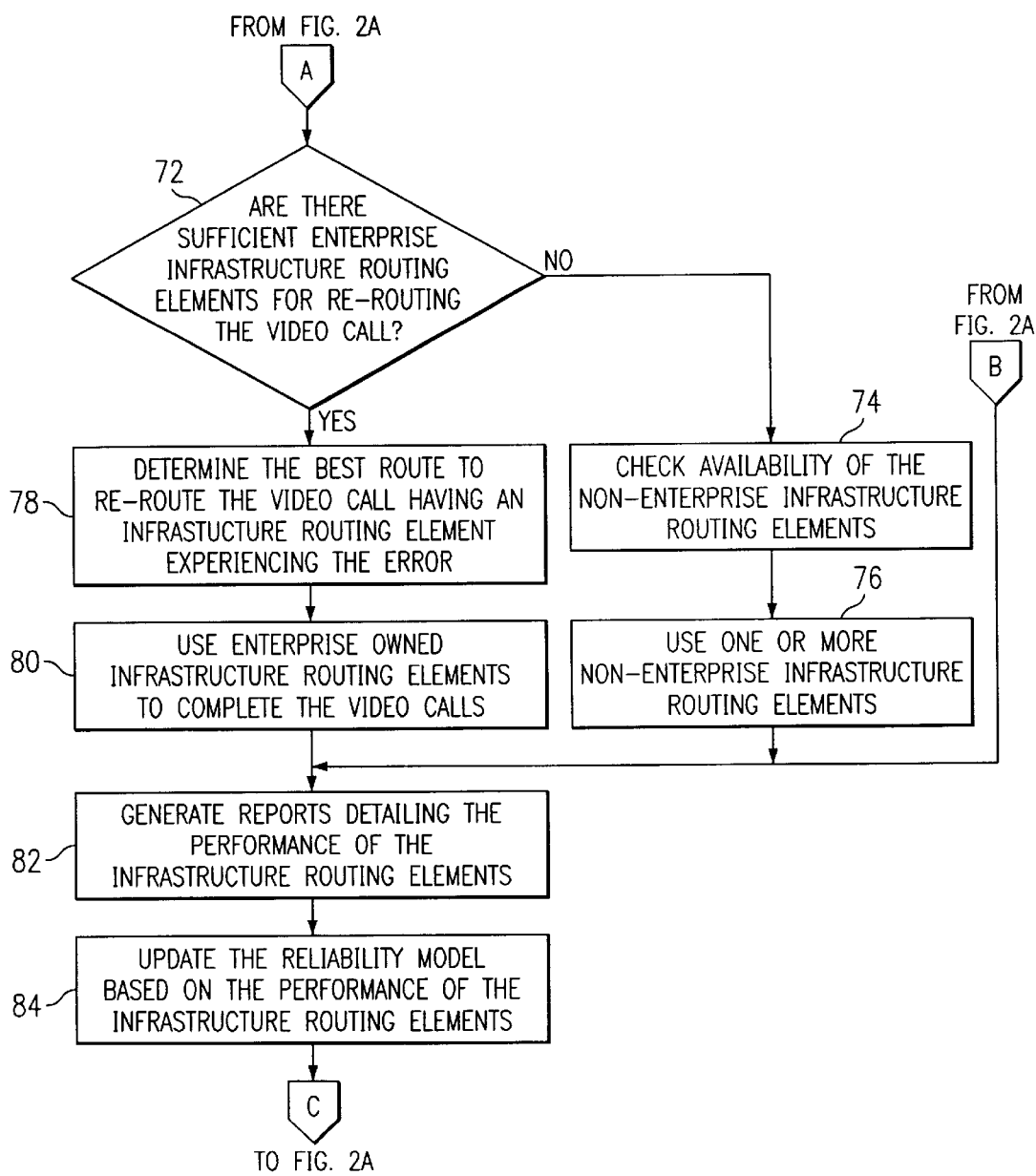

FIGS. 2A and 2B depict a method of routing video calls using reliability models 36 for infrastructure routing elements 16. The method begins at step 60 where video network platform 12 sets up one or more video calls between video endpoints 14. Video network platform 12 may establish the video calls by setting up principle and back-up routes as described above, have scheduling engine 34 set up the video call routes using reliability models 36 and the most dependable infrastructure routing elements 16, or a combination of the principle and back-up routes with reliability models 36. As the video calls begin, scheduling engine 34 begins to monitor the video calls and the performance of infrastructure routing elements 16 and any combinations of infrastructure routing elements 16 at step 62. At step 64, scheduling engine 34 begins to determine and update reliability models 36 for infrastructure routing elements 16 based on the performance of infrastructure routing elements 16.

At step 66, scheduling engine 34 continues to monitor and track the performance of infrastructure routing elements 16 and any combinations of infrastructure routing elements 16 for any errors or malfunctions. If there are no errors at step 66, the method returns to step 62 where scheduling engine 34 continues to monitor the performance of infrastructure routing elements 16. If there is an error at step 66, then at step 68 scheduling engine 34 must re-route the video call.

But to re-route the video call, scheduling engine 34 has to first determine if the video call may be re-routed through a different input port or output port on the same infrastructure routing element 16. If at step 68 the video call may be re-routed through a different port on the same infrastructure routing element 16, then at step 70 scheduling engine 34 re-routes the video call through a different port and the method continues on to step 82 where scheduling engine 34 generates a report detailing the failure of the specific port and how the video call was re-routed to a different port and at step 84 updates reliability model 36 associated with infrastructure routing element 16 having the error noting which port had the error.

If at step 68 scheduling engine 34 cannot re-route the video call to a different port on the same infrastructure routing element 16, then at step 72 scheduling engine 34 determines if there are sufficient enterprise owned infrastructure routing elements 16 available to re-route the video call. If there are not any enterprise owned infrastructure routing elements 16 available at step 72, then at step 74 scheduling engine 34 checks the availability of non-enterprise infrastructure routing elements 40. Because scheduling engine 34 has previously calculated a probability that video network 10 may need to use non-enterprise infrastructure routing elements 40, there should be non-enterprise infrastructure routing elements 40 available for use. Because of the probability of use, the owner of non-enterprise infrastructure routing elements 40 will make arrangements to make sure there are non-enterprise infrastructure routing elements 40 available to scheduling engine 34. At step 76, scheduling engine 34 uses the non-enterprise infrastructure routing elements 40 to re-route the video call and in step 82 generates a report regarding the failure of infrastructure routing elements 16 and the use of non-enterprise infrastructure routing elements 40. At step 84, scheduling engine 34 updates reliability model 36 associated with the failed infrastructure routing elements 16.

If at step 72 there are sufficient enterprise owned infrastructure routing elements 16 available for re-routing, then at step 78 scheduling engine 34 determines the best route for re-routing the video call by re-routing to the back-up route, examining reliability models 36, or through discreet element back-up scheduling, all as described above. At step 80, scheduling engine 34 re-routes the video call using a route through enterprise owned infrastructure routing elements 16. Scheduling engine 34 generates one or more reports at step 82 detailing the failure of infrastructure routing element 16 and at step 84 updates reliability model 36 associated with the failed infrastructure routing element 16. Once scheduling engine 34 updates reliability models 36, the method returns to step 62 where scheduling engine 34 continues to monitor the performance of infrastructure routing elements 16.

Although the present invention has been described in detail, it should be understood that various changes, substitutions and alterations can be made hereto without departing from the spirit and scope of the invention as defined by the pending claims.

What is claimed is:

1. A video network for routing video calls, the video network comprising:
   one or more video endpoints;
   an array of infrastructure routing elements associated with the video endpoints, the infrastructure routing elements operable to transmit the video calls between the video endpoints along one or more routes;
   a video network platform in communication with the video endpoints and the infrastructure routing elements; and
   a scheduling engine associated with the video network platform and the infrastructure routing elements, the scheduling engine operable to monitor the performance of the infrastructure routing elements, to determine a plurality of reliability models for the infrastructure routing elements, and to intelligently route video calls based on the reliability models.

2. The video network of claim 1 wherein the infrastructure routing elements comprise one or more multipoint control units including one or more input ports and one or more output ports.

3. The video network of claim 2 wherein the scheduling engine is further operable to intelligently route video calls based on a reliability model for each input port and each output port of the multipoint control units.

4. The video network of claim 2 wherein the scheduling engine is further operable to re-route a video call between different input ports and output ports on a multipoint control unit allowing for the re-routing of the video calls without losing communication between the video endpoints.

5. The video network of claim 1 wherein the scheduling engine is further operable to perform back-up scheduling using each infrastructure routing element as a discreet element.

6. The video network of claim 1 wherein the scheduling engine is further operable to update the reliability models for each infrastructure routing element based on the performance of each infrastructure routing element.

7. The video conference of claim 1 wherein the scheduling engine monitors the infrastructure routing elements for failure.

8. The video network of claim 1 further comprising a pool of non-enterprise infrastructure routing elements.

9. The video network of claim 8 wherein the scheduling engine is further operable to:
   determine a probability regarding when the non-enterprise infrastructure routing elements are needed and how many non-enterprise infrastructure routing elements are needed; and
   schedule use of the non-enterprise infrastructure routing elements based on the probability.

10. The video network of claim 1 wherein the scheduling engine is further operable to generate one or more reports regarding the performance of each infrastructure routing element.

11. The video network of claim 1 wherein the schedule engine re-routes a video call to a back-up route when an infrastructure routing element experiences a failure.

12. The video network of claim 1 wherein the reliability models comprise a plurality of operational parameters regarding the operation of the infrastructure routing elements.

13. The video network of claim 1 wherein the scheduling engine is operable to re-route a video call based on the reliability models without losing communication between the video endpoints.

14. The video network of claim 1 wherein the video endpoints comprise a diversity of video conferencing endpoints.

15. The video network of claim 1 wherein the scheduling engine is further operable to monitor and route more than one video call simultaneously.

16. The video network of claim 1 wherein the scheduling engine is further operable to calculate reliability models for one or more combinations of infrastructure routing elements.

17. A method for routing video calls, the method comprising:
- monitoring the performance of an array of infrastructure routing elements;
- determining a plurality of reliability models for the infrastructure routing elements;
- intelligently routing video calls based on the reliability models; and
- transmitting one or more video calls between plural video endpoints across the infrastructure routing elements along one or more routes.

18. The method of claim 17 wherein intelligently routing video calls comprises prioritizing the routes for the video calls.

19. The method of claim 17 wherein determining a reliability model for each infrastructure routing element comprises updating the reliability models based on the performance of each infrastructure routing element.

20. The method of claim 17 further comprising using one or more non-enterprise infrastructure routing elements to complete the video call.

21. The method of claim 20 wherein using non-enterprise infrastructure routing elements comprises:
- determining a probability regarding when the non-enterprise infrastructure elements are needed and how many non-enterprise infrastructure routing elements are needed; and
- scheduling use of the non-enterprise infrastructure routing elements based on the probability.

22. The method of claim 17 further comprising generating one or more reports detailing a plurality of operational parameters for each infrastructure routing element.

23. The method of claim 17 wherein the infrastructure routing elements comprise one or more multipoint control units including one or more input ports and one or more output ports.

24. The method of claim 23 further comprising intelligently routing video calls based on a reliability model for each input port and each output port of the multipoint control units.

25. The method of claim 17 wherein intelligently routing video calls based on the reliability model comprises re-routing the video calls without losing communication between the video endpoints.

26. The method of claim 17 wherein intelligently routing video calls comprises reestablishing the video calls using a back-up route when the infrastructure routing element in a route currently transmitting the video call experiences a failure.

27. The method of claim 17 further comprising performing back-up scheduling for each infrastructure routing element as a discreet element.

28. The method of claim 17 wherein monitoring the performance of the infrastructure routing elements comprises monitoring the infrastructure routing elements for failure.

29. The method of claim 17 further comprising re-routing the video calls without changing the infrastructure routing elements.

30. The method of claim 17 further comprising:
- monitoring more than one video call simultaneously; and
- routing more than one video call simultaneously.

31. The method of claim 17 wherein determining a plurality of reliability models for the infrastructure routing elements comprises calculating reliability models for one or more combinations of infrastructure routing elements.

32. A system for routing video calls, the system comprising:
- plural video devices;
- one or more principle routes associated with the video devices, the principle routes operable to provide a communication path between two or more video devices;
- one or more back-up routes associated with the primary routes, the back-up routes operable to provide a communication path between two or more video devices when a principle route experience a failure; and
- a video network platform associated with the video devices, the video network platform operable to prioritize the primary routes and the back-up routes.

33. The system of claim 32 wherein the video network platform is further operable to redirect a back-up route when the back-up route interferes with a principle route.

34. The system of claim 32 wherein the video network platform is further operable to re-route the primary routes and the back-up routes based on the performance of the video devices.

35. The system of claim 32 wherein one or more principle routes utilize the same back-up route.

* * * * *